(12) United States Patent
Azuma

(10) Patent No.: US 9,323,961 B2
(45) Date of Patent: Apr. 26, 2016

(54) PORTABLE ELECTRONIC DEVICE

(71) Applicant: Yoshihiro Azuma, Tokyo (JP)

(72) Inventor: Yoshihiro Azuma, Tokyo (JP)

( * ) Notice: Subject to any disclaimer, the term of this patent is extended or adjusted under 35 U.S.C. 154(b) by 0 days.

(21) Appl. No.: 14/649,814

(22) PCT Filed: Nov. 8, 2013

(86) PCT No.: PCT/JP2013/080355
§ 371 (c)(1),
(2) Date: Jun. 4, 2015

(87) PCT Pub. No.: WO2015/015661
PCT Pub. Date: Feb. 5, 2015

(65) Prior Publication Data
US 2015/0317497 A1    Nov. 5, 2015

(30) Foreign Application Priority Data
Jul. 31, 2013    (JP) .................................. 2013-158474

(51) Int. Cl.
*G06F 19/00*    (2011.01)
*G06K 7/00*    (2006.01)
*G06K 7/08*    (2006.01)

(52) U.S. Cl.
CPC .............. *G06K 7/0004* (2013.01); *G06K 7/006* (2013.01); *G06K 7/0065* (2013.01); *G06K 7/084* (2013.01); *G06K 7/089* (2013.01)

(58) Field of Classification Search
CPC ............ G06K 7/0004; G06K 7/10881; G06K 7/1098; G06Q 20/20; G07G 1/0081
USPC .................................... 235/385, 492; 705/17
See application file for complete search history.

(56) References Cited

U.S. PATENT DOCUMENTS

| 6,659,348 B2 | 12/2003 | Nagata et al. |
| 7,059,520 B1 | 6/2006 | Shtesl |
| D681,639 S | 5/2013 | Cruz et al. |
| 8,856,033 B2 * | 10/2014 | Hicks ................... G07G 1/0081 235/385 |
| 2010/0241572 A1 | 9/2010 | Yuan |
| 2012/0250276 A1 | 10/2012 | Nakajima |
| 2014/0344154 A1 * | 11/2014 | Flurscheim ............ G06Q 20/10 705/44 |
| 2014/0347000 A1 * | 11/2014 | Hamann ................. G06F 1/189 320/103 |

FOREIGN PATENT DOCUMENTS

| CN | 2696047 Y | 4/2005 |
| EP | 0 492 358 A1 | 7/1992 |
| EP | 1 072 023 B1 | 4/2007 |
| FR | 2 926 150 A1 | 7/2009 |
| GB | 2499431 A | 8/2013 |
| JP | S64-76379 A | 3/1989 |
| JP | H3-189785 A | 8/1991 |
| JP | 2002-536772 A | 10/2002 |
| JP | 2003-272051 A | 9/2003 |

(Continued)

*Primary Examiner* — Seung Lee
(74) *Attorney, Agent, or Firm* — Muncy, Geissler, Olds & Lowe, P.C.

(57) ABSTRACT

The problem of the present invention is to provide a tablet-type portable electronic device that can perform payment by way of a card, as well as having a compact size. A tablet-type portable electronic device of the present invention includes a plate-shaped housing having a front surface, a touch panel and display unit provided to the front surface of the housing, and reading units that perform reading processing of a card related to payment. The reading units are configured integrally with the housing.

6 Claims, 6 Drawing Sheets

(56) References Cited

FOREIGN PATENT DOCUMENTS

| | | | |
|---|---|---|---|
| JP | 2006-009959 A | 1/2006 | |
| JP | 2006-099599 A | 4/2006 | |
| JP | 2011-166275 A | 8/2011 | |
| JP | 2012-185543 A | 9/2012 | |
| JP | 2012-215682 A | 11/2012 | |
| JP | 2013-3810 A | 1/2013 | |

* cited by examiner

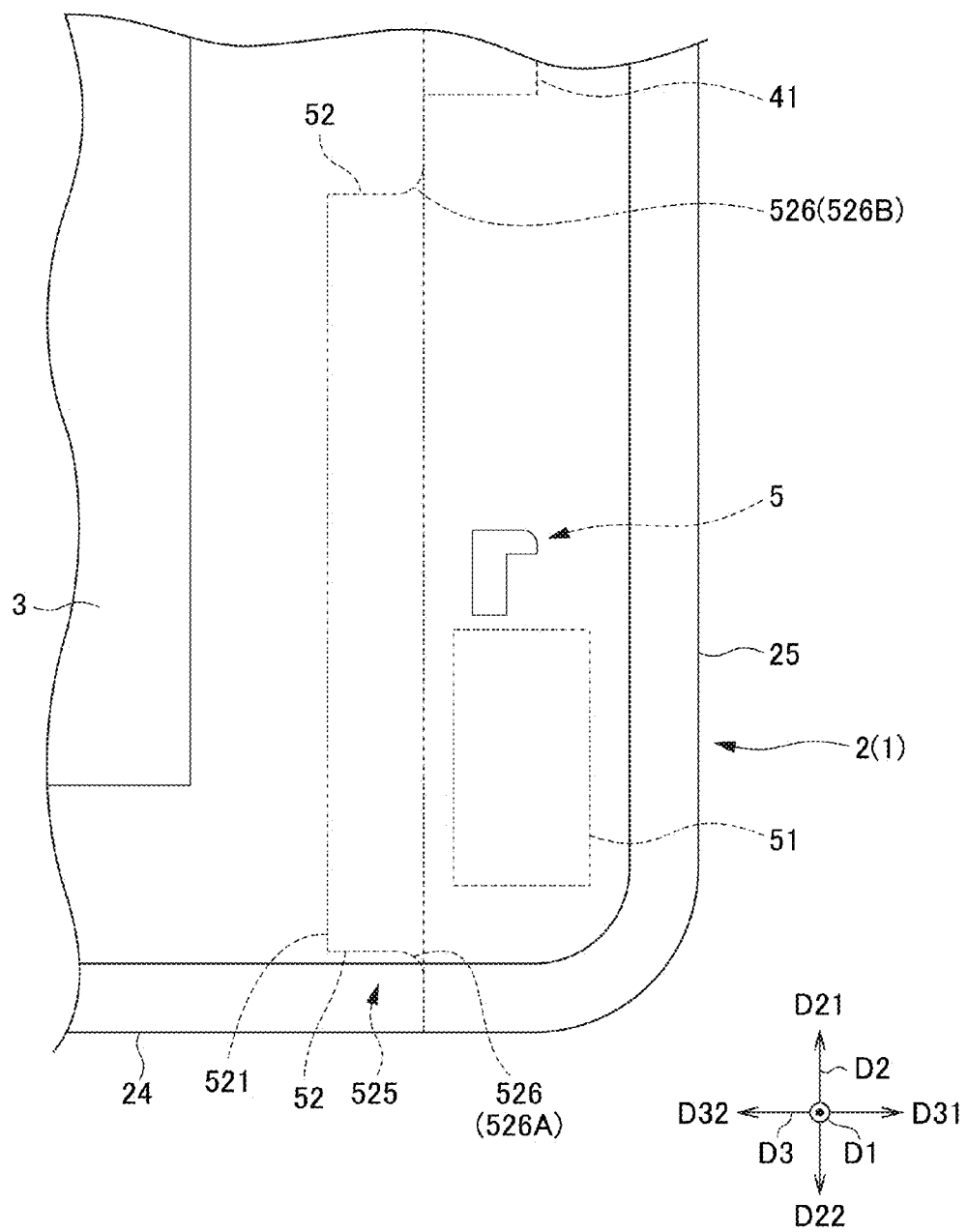

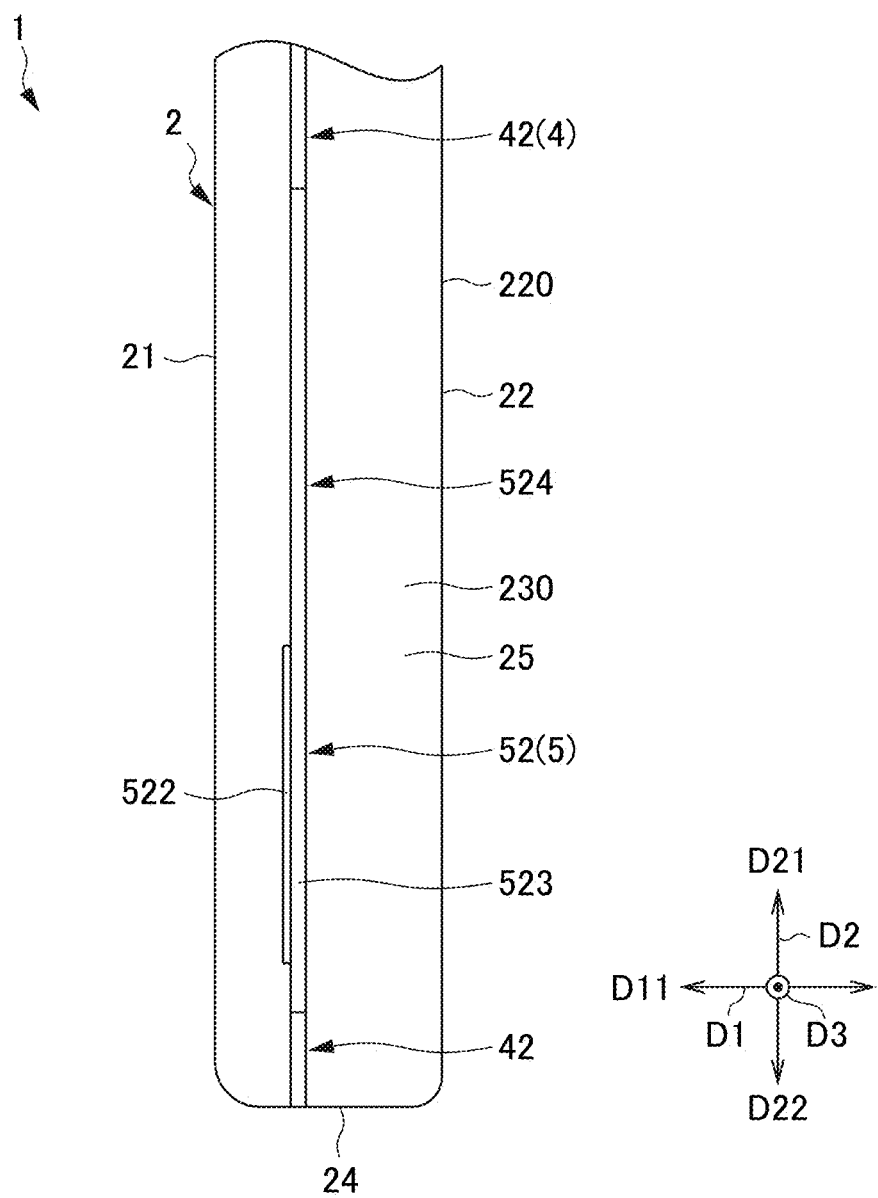

PORTABLE ELECTRONIC DEVICE

TECHNICAL FIELD

The present invention relates to a tablet-type portable electronic device having the payment function for cards.

BACKGROUND ART

Tablet-type portable electronic devices have come to be popular (e.g., refer to Patent Document 1). On the other hand, payment terminals dedicated for making payments with various cards (credit cards, cash cards, etc.) consisting of IC cards and magnetic cards are also known (e.g., refer to Patent Document 2).

Patent Document 1: Japanese Unexamined Patent Application, Publication No. 2012-215682

Patent Document 2: Japanese Unexamined Patent Application, Publication No. 2013-003810

DISCLOSURE OF THE INVENTION

Problems to be Solved by the Invention

A tablet-type portable electronic device that can perform payment by way of a card as well as being compact has been demanded.

The present invention has an object of providing a tablet-type portable electronic device that can perform payment by way of a card as well as being compact.

Means for Solving the Problems

The present invention is a tablet-type portable electronic device including: a plate-shaped housing; a touch panel and display unit provided to a front surface of the housing; and a reading unit that performs reading processing of a card related to payment, in which the reading unit is configured integrally with the housing.

In addition, the reading unit may include an IC reading unit that performs reading processing of an IC card serving as the card, and a magnetic reading unit that performs reading processing of a magnetic card serving as the card, the IC reading unit may have an IC sensor that acquires electronic information from an IC chip of the IC card, and an IC insertion groove provided in the housing for guiding the IC chip of the IC card to a position of the IC sensor, the magnetic reading unit may include a magnetic sensor that acquires magnetic information from a magnetic recording part of the magnetic card, and a magnetic insertion groove provided in the housing for guiding the magnetic recording part of the magnetic card to a position of the magnetic sensor, and the IC insertion groove and the magnet insertion groove may be overlapping in portions thereof.

Furthermore, a bottom part of the IC insertion groove may be provided more in an interior region than a bottom part of the magnet insertion groove, in an insertion direction of the IC card to the IC insertion groove, and the IC card may be arranged in the interior region.

Moreover, the IC insertion groove may include an embossing groove part having a shape corresponding to an embossing of the IC card.

Additionally, the IC reading unit may include a contact-type IC reading unit that performs reading processing of a contact-type IC card serving as the IC card, and a non-contact-type IC reading unit that performs reading processing of a non-contact-type IC card serving as the IC card.

Furthermore, the housing and the display unit may be substantially rectangular in a front view of the portable electronic device, and the contact-type IC reading unit and the magnetic reading unit may be arranged to a side of one vertical lateral surface of the housing, and the non-contact-type IC reading unit may be arranged to a side of another vertical lateral surface of the housing.

Effects of the Invention

According to the present invention, it is possible to provide a tablet-type portable electronic device that can perform payment by way of a card, as well as being compact.

BRIEF DESCRIPTION OF THE DRAWINGS

FIG. 3 is a partially enlarged view of FIG. 2;

FIG. 4 is a partial right-side view of the portable electronic device 1 of the embodiment;

PREFERRED MODE FOR CARRYING OUT THE INVENTION

Figure 1:
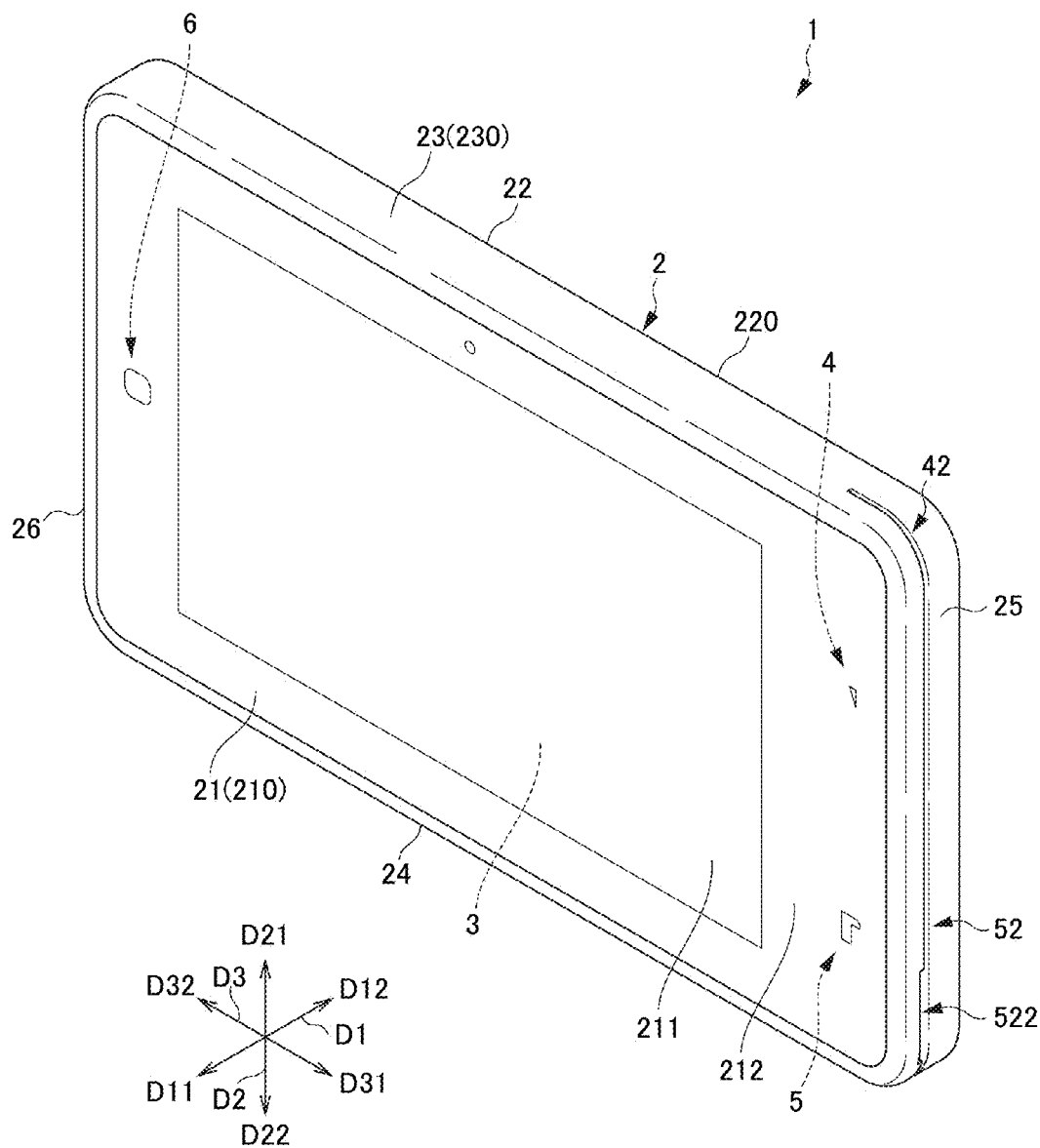
FIG. 1 is a perspective view showing a portable electronic device 1 of an embodiment of the present invention.
Figure 2:
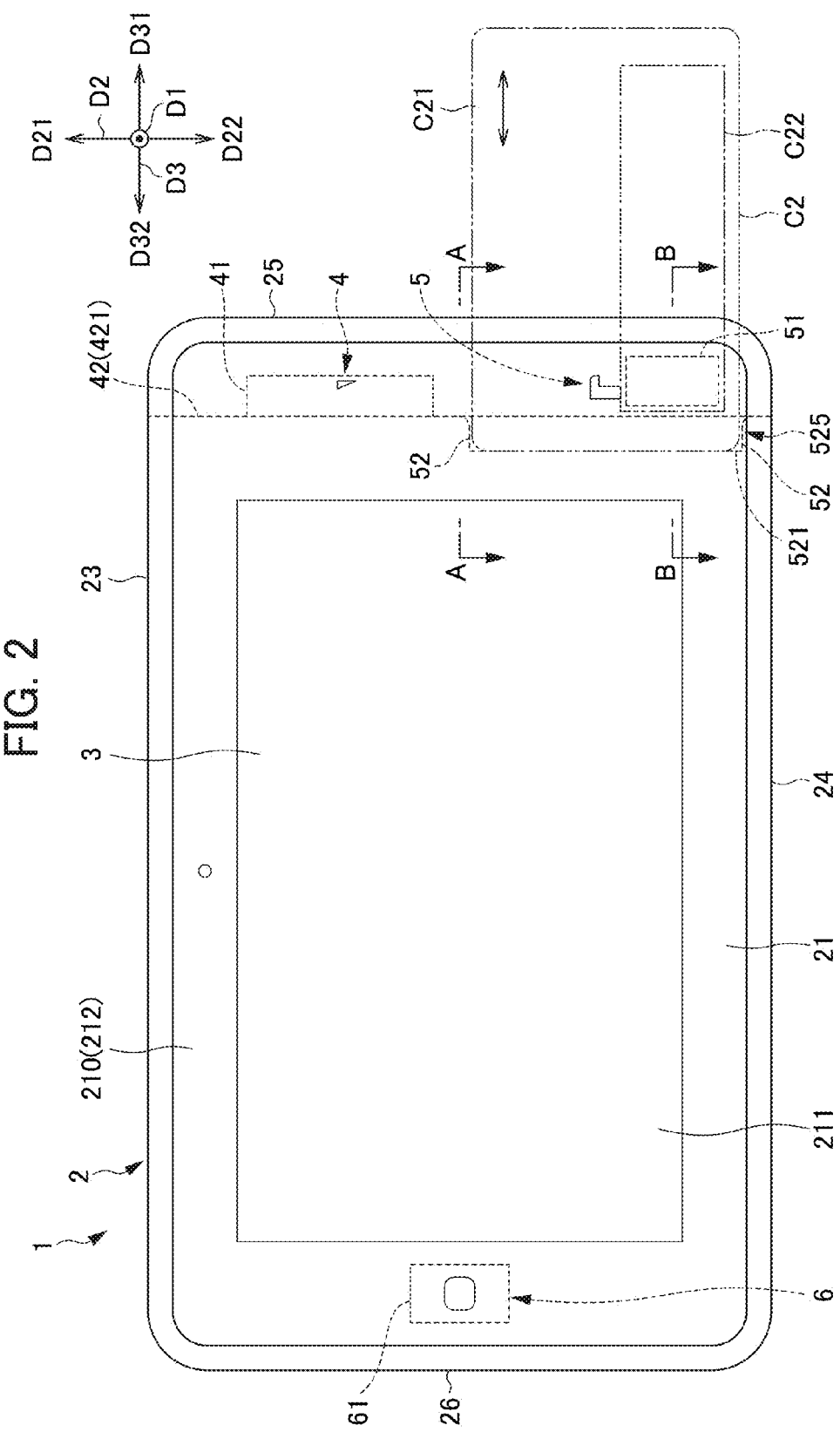
FIG. 2 is a front view showing the portable electronic device 1 of the embodiment.
Figure 5A:
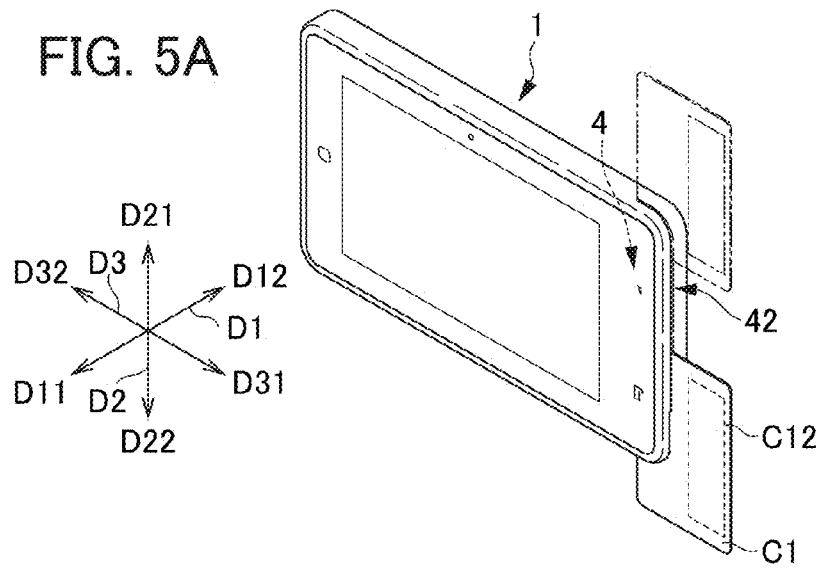
FIG. 5A is a perspective view showing a reading situation of a card during payment by way of the portable electronic device 1 of the embodiment, showing reading of a magnetic card C1.
Figure 5B:
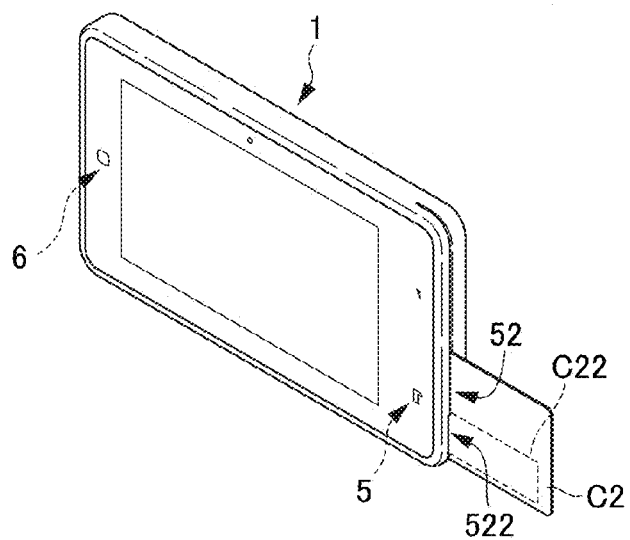
FIG. 5B is a perspective view showing a reading situation of a card during payment by way of the portable electronic device 1 of the embodiment, showing reading of a contact-type IC card C2.
Figure 5C:
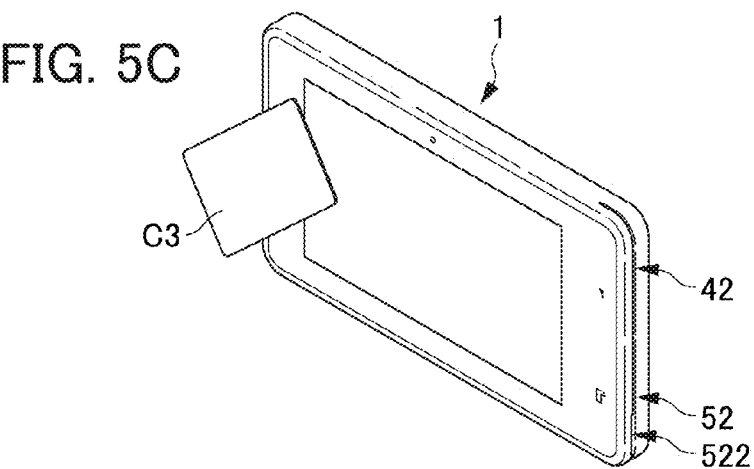
FIG. 5C is a perspective view showing a reading situation of a card during payment by way of the portable electronic device 1 of the embodiment, showing reading of a non-contact-type IC card C3.
Figure 6:
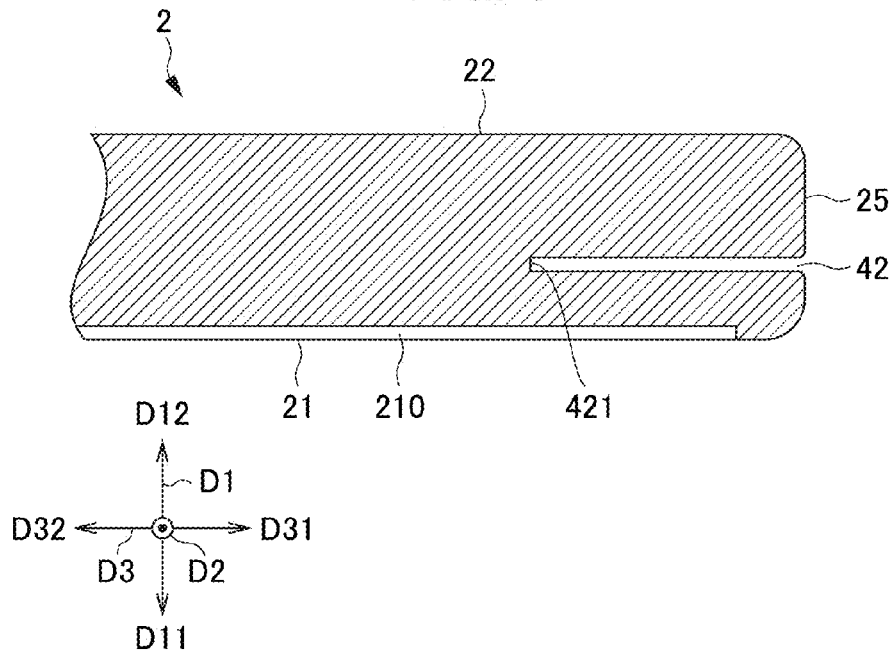
FIG. 6 is a cross-sectional view along the line A-A in FIG. 2.
Figure 7:
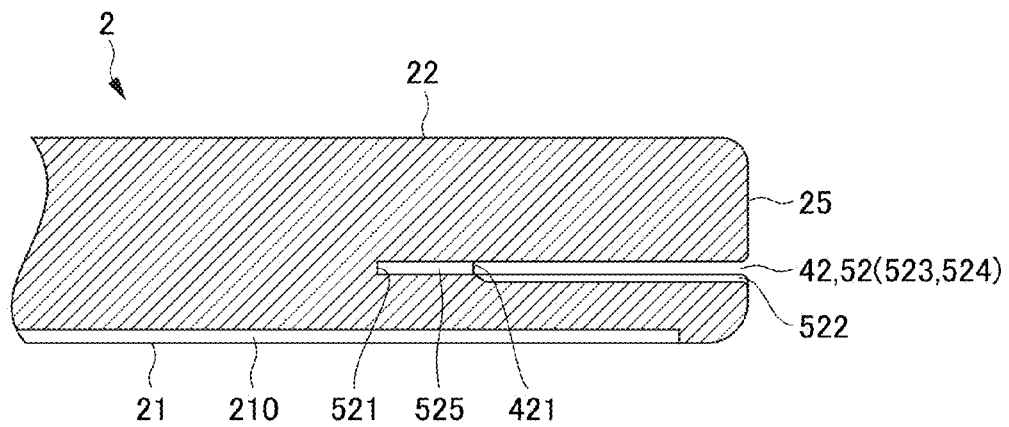
FIG. 7 is a cross-sectional view along the line B-B in FIG. 2.

Hereinafter, a portable electronic device 1 of an embodiment of the present invention will be explained while referencing the drawings. FIG. 1 is a perspective view showing the portable electronic device 1 of the embodiment of the present invention. FIG. 2 is a front view of the portable electronic device 1 of the embodiment. FIG. 3 is a partially enlarged view of FIG. 2. FIG. 4 is a partial right-side view of the portable electronic device 1 of the embodiment. FIG. 5A is a perspective view showing a reading situation of a card during payment by way of the portable electronic device 1 of the embodiment, showing reading of a magnetic card C1. FIG. 5B is a perspective view showing a reading situation of a card during payment by way of the portable electronic device 1 of the embodiment, showing reading of a contact-type IC card C2. FIG. 5C is a perspective view showing a reading situation of a card during payment by way of the portable electronic device 1 of the embodiment, showing reading of a non-contact-type IC card C3. FIG. 6 is a cross-sectional view along the line A-A in FIG. 2. FIG. 7 is a cross-sectional view along the line B-B in FIG. 2.

As shown in FIGS. 1 to 4, the portable electronic device 1 of the embodiment includes a housing 2, a touch panel display unit 3, a magnetic reading unit 4, a contact-type IC reading unit 5, and a non-contact-type reading unit 6. The portable electronic device 1 may include general functions as a tablet-type terminal, e.g., a wired communication unit, wireless communication unit, buttons as an input device, speaker, and GPS (Global Positioning System) unit.

The housing 2 configures an external principle part of the portable electronic device 1, and has a substantially rectangular shape of a flat plate shape. The housing 2 includes an oblong, substantially rectangular front surface 21 and back surface 22, top surface 23, bottom surface 24, right surface 25 and left surface 26.

It should be noted that "substantially rectangular" in the present specification includes all shapes considered as rectangles in the overall perspective and, for example, also includes a perfect rectangle, rectangles having rounded corners, shapes having sides slightly curved, and the like.

The housing 2 includes a front cover 210 mainly constituting the front surface 21, a frame 230 mainly constituting the top surface 23, bottom surface 24, right surface 25 and left surface 26, and a rear cover 220 mainly constituting the back surface 22.

In each drawing, the thickness direction, longitudinal direction and lateral direction are respectively referred to as thickness direction D1, longitudinal direction D2 and lateral direction D3. In addition, in the thickness direction D1, the direction towards the front surface 21 is referred to as forward direction D11, and the direction towards the back surface 22 is referred to as the rear direction D12. In the longitudinal direction D2, the direction towards the top surface 23 is referred to as the up direction D21, and the direction towards the bottom surface 24 is referred to as the down direction D22. In the lateral direction D3, the direction towards the right surface 25 is referred to as the right direction D31, and the direction towards the left surface 26 is referred to as the left direction D32.

The front cover 210 is configured from a translucent material such as glass or plastic. The front cover 210 includes a rectangular transparent display region 211, and an opaque frame region 212 that encircles the four sides of the display region 211. The display region 211 and frame region 212 are arranged on the same plane.

The rear cover 220 is configured by a metallic material such as aluminum alloy or magnesium alloy, for example.

The front cover 210 and rear cover 220 are arranged in parallel with an interval from each other in the thickness direction D1 of the housing 2. In other words, the rear cover 220 is arranged on an opposite side in the thickness direction D1 of the housing 2 relative to the front cover 210.

The frame 230 is provided between the front cover 210 and rear cover 220. The frame 230 is configured by a metallic material such as aluminum alloy or magnesium alloy, or a high-rigidity resin, for example. High-rigidity resin is a fiber reinforced resin produced by mixing an additive such as glass fiber, carbon fiber, other reinforcing fiber and talc into a resin.

The frame 230 is continuous in the peripheral direction so as to constitute the top surface 23, bottom surface 24, right surface 25 and left surface 26.

The touch panel display unit 3 is provided to the front surface 21 of the housing 2. The touch panel display unit 3 includes a touch panel and a display unit. The touch panel is of piezoelectric-type or electrostatic-type having a contact-type input function. The touch panel is fixed by a means such as adhesive to the rear surface side of the display region 211 of the front cover 210. The display unit has a substantially rectangular display screen that displays images and pictures in the front surface view of the housing 2. The display screen is arranged at the rear surface side of the touch panel.

As shown in FIG. 5A, the magnetic reading unit 4 performs reading processing of the magnetic card C1. As shown in FIG. 5B, the contact-type IC reading unit 5 performs reading processing of the contact-type IC card C2. As shown in FIG. 5C, the non-contact-type IC reading unit 6 performs reading processing of the non-contact-type IC card C3.

The magnetic reading unit 4, contact-type IC reading unit 5 and non-contact-type IC reading unit 6 are integrally configured with the housing 2.

As shown in FIGS. 1 to 6, the magnetic reading unit 4 includes the magnetic sensor 41 and magnet insertion groove 42.

The magnetic sensor 41 is called a magnet head, and acquires magnetic information from a magnetic recording part of the magnetic card C1. The magnet insertion groove 42 is provided in the housing 2 for guiding the magnetic recording part of the magnetic card C1 to the position of the magnetic sensor 41. The magnetic sensor 41 is arranged inside of the housing 2 so that the detection part thereof faces the interior of the magnet insertion groove 42.

The magnet insertion groove 42 extends linearly in the longitudinal direction D2, and opens to the top surface 23 and bottom surface 24. In addition, the magnet insertion groove 42 opens to the right surface 25, and is concave at the bottom in the left direction D32. A bottom part 421 of the magnet insertion groove 42 extends linearly in the longitudinal direction D2. The thickness of the magnet insertion groove 42 (thickness in the thickness direction D1 of the housing 2) is slightly thicker than the thickness of the magnetic card C1 (thickness of a region other than an embossing C12 in which the name and card number are punched).

For this reason, as shown in FIG. 5A, after inserting the magnetic card C1 in the magnet insertion groove 42, it is possible to slide the magnetic card C1 in the longitudinal direction D2 without backlash. It should be noted that, even if inserting the magnetic card C1 until the bottom part 421 of the magnet insertion groove 42, the embossing C12 of the magnetic card C1 will not be positioned in the magnet insertion groove 42.

By positioning a part of the magnetic card C1 inside of the magnet insertion groove 42, and moving the magnetic card C1 in the longitudinal direction D2, the magnetic information in the magnetic recording part of the magnetic card C1 is acquired by the magnetic sensor 41.

As shown in FIGS. 1 to 7, the contact-type IC reading unit 5 includes a contact-type IC sensor 51 and an IC insertion groove 52.

The contact-type IC sensor 51 acquires electronic information from the IC chip by contacting the IC chip of the contact-type IC card C2. The IC insertion groove 52 is provided to the housing 2 for guiding the IC chip of the contact-type IC card C2 to the position of the contact-type IC sensor 51.

The IC insertion groove 52 opens in the right surface 25, and is concaved with a bottom towards the left direction D32. A bottom part 521 of the IC insertion groove 52 is positioned more to the left direction D32 than the bottom part 421 of the magnet insertion groove 42. In other words, in the insertion direction of the contact-type IC card C2 to the IC insertion groove 52 (left direction D32), the IC insertion groove 52 becomes deeper than the magnet insertion groove 42.

That is, in the insertion direction of the contact-type IC card C2 to the IC insertion groove 52 (left direction D32), the bottom part 521 of the IC insertion groove 52 is provided more in an interior region 525 than the bottom part 421 of the magnet insertion groove 42. The interior region 525 is a region in the IC insertion groove 52 that is a region more to the interior than the magnet insertion groove 42.

The contact-type IC sensor 51 is arranged at the interior region 525. In detail, the contact-type IC sensor 51 is arranged inside of the housing 2 so that the detection unit thereof faces an inner part of the interior region 525 of the IC insertion groove 52.

As shown in FIG. 7, in a right surface view, the IC insertion groove 52 includes an embossing groove part 522 and a main groove part 523. The embossing groove part 522 has a shape corresponding to an embossing C22 of the contact-type IC card C2. The main groove part 523 has a shape corresponding to a region C21 other than the embossing C22 of the contact-type IC card C2.

The thickness of the main groove part 523 (thickness in thickness direction D1 of housing 2) is slightly thicker than the thickness of the region C21 other than the embossing C22 of the contact-type IC card C22, and is slight thinner than the thickness of the embossing C22 of the contact-type IC card C2. In addition, the thickness of the embossing groove part 522 (thickness in the thickness direction D1 of the housing 2) is slightly thicker than the thickness of the embossing C22 of the contact-type IC card C2.

For this reason, it is possible to insert the contact-type IC card C2 in the IC insertion groove 52, if positioning the embossing C22 of the contact-type IC card C2 in the embossing groove part 522 of the IC insertion groove 52. Then, the contact-type IC card C2 can be made to slide in the left direction D32 without backlash.

When inserted to the interior region 525 of the IC insertion groove 52, the contact-type IC card C2 is retained thereby. The electronic information in the IC chip of the contact-type IC card C2 is thereby acquired by the contact-type IC sensor 51.

As shown in FIG. 3, both entrance edges 526 at the entrances of the interior region 525 of the IC insertion groove 52 are rounded (forming R) in the front view. Upon inserting the contact-type IC card C2 in the interior region 525 of the IC insertion groove 52, the contact-type IC card C2 tends to be guided to the interior region 525. In addition, when the magnetic card C1 is made to slide in the magnet insertion groove 42, even if the magnetic card C1 seems like it will move to the interior region 525 of the IC insertion groove 52, the magnetic card C1 will hit the entrance edge 526 (526A) of the interior region 525. Upon doing so, since the entrance edges 526 (526A) are rounded, the magnetic card C1 is hardly obstructed at the entrance edge 526 (526A), and the movement direction of the magnetic card C1 is rectified in the appropriate direction.

It should be noted that, among the two entrance edges 526 of the interior region 525, an entrance edge 526B positioned on the upstream side in the movement direction (down direction D22) of the magnetic card C1 may be angular without rounding.

In addition, the magnet insertion groove 42 and IC insertion groove 52 overlap in a portion of these. In detail, in the IC insertion groove 52, a region more in the right direction D31 than the bottom part 421 of the magnet insertion groove 42 becomes a region in which the magnet insertion groove 42 and IC insertion groove 52 overlap (also referred to as "overlap region 524").

As shown in FIG. 2, the non-contact-type IC reading unit 6 includes a non-contact-type IC sensor 61. The non-contact-type IC sensor 61 consists of an antenna. The non-contact-type IC card C3 includes an IC chip and antenna. By sending and receiving data between the antenna of the non-contact-type IC sensor 61 and the antenna of the non-contact-type IC card C3, the non-contact-type IC reading unit 6 acquires electronic information from the IC chip in the non-contact-type IC card C3 arranged in the vicinity of the non-contact-type IC sensor 61 on the side of the front surface 21 of the housing 2. As an example of the non-contact-type IC card C3, a card of the NFC (Near Field Communication) standard can be exemplified.

By causing the non-contact-type IC card C3 to approach the non-contact-type IC reading unit 6, the electronic information of the IC chip of the non-contact-type IC card C3 is acquired by the non-contact-type IC sensor 61.

In this way, the magnetic reading unit 4 and contact-type IC reading unit 5 are arranged to the side of one vertical lateral surface (right surface 25) of the housing 2, in a front view of the housing 2. In addition, the non-contact-type IC reading unit 6 is arranged to the side of another lateral surface (left surface 26) of the housing 2.

The following effects are exerted according to the portable electronic device 1 of the embodiment, for example.

The portable electronic device 1 of the embodiment includes the housing 2 and the touch panel display unit 3 provided to the front surface 21 of the housing 2, along with including the magnetic reading unit 4, contact-type IC reading unit 5 and non-contact-type IC reading unit 6 as reading units that perform reading processing of cards related to payment. The magnetic reading unit 4, contact-type IC reading unit 5 and non-contact-type IC reading unit 6 are integrally configured with the housing 2. For this reason, according to the portable electronic device 1 of the embodiment, it is possible provide a tablet-type portable electronic device 1 that can perform payment by cards, as well as being compact.

In addition, compared to a configuration establishing a separate reading unit (card reader) to be external via a cable, it is possible to avoid skimming from the cable connection portion. In addition, by configuring integrally, it is possible to improve the portability and operability.

In addition, the IC reading unit 5 includes the contact-type IC sensor 51 that acquires electronic information from the IC chip of the contact-type IC card C2, and the IC insertion groove 52 provided in the housing 2 for guiding the IC chip of the contact-type IC card C2 to the position of the contact-type IC sensor 51. The magnetic reading unit 4 includes the magnetic sensor 41 that acquires magnetic information from the magnetic recording part of the magnetic card C1, and the magnet insertion groove 42 provided in the housing 2 for guiding the magnetic recording part of the magnetic card C1 to the position of the magnetic sensor 41. The IC insertion groove 52 and magnetic insertion groove 42 overlap in parts thereof. For this reason, it is possible to achieve space savings of the space (room) of the IC insertion groove 52 and the space (room) of the magnet insertion groove 42.

In addition, in the insertion direction D32 of the contact-type IC card C2 to the IC insertion groove 52, the IC insertion groove 52 is provided more to the interior region 525 than the magnetic insertion groove 42. In addition, the contact-type IC sensor 51 is arranged in the interior region 525. For this reason, it is possible to arrange the contact-type IC sensor 51 at a position not overlapping the magnet insertion groove 42, and thus the degree of freedom in design is high.

In addition, the IC insertion groove 52 includes the embossing groove part 522 having a shape corresponding to the embossing C22 of the contact-type IC card C2. For this reason, during insertion of the contact-type IC card C2 to the IC insertion groove 52, it is possible to apply the embossing groove part 522 as an insertion guide.

In addition, in the front view of the portable electronic device 1, the contact-type IC reading unit 5 and the magnetic reading unit 4 are arranged to a side of the right surface 25, which is the one vertical lateral surface, of the housing 2. In addition, the non-contact-type IC reading unit 6 is arranged to a side of the left surface 26, which is the other vertical lateral surface, of the housing 2. For this reason, compared to a format in which the contact-type IC reading unit 5, magnetic reading unit 4 and non-contact-type IC reading unit 6 are arranged on the side of the right surface 25, for example, it is easier to achieve a size reduction in the longitudinal direction D2.

Although an ideal embodiment of the present invention is explained in the foregoing, the present invention is not to be limited to the aforementioned embodiment, and can be implemented in various forms.

For example, in the embodiment, although the magnetic reading unit 4, contact-type reading unit 5 and non-contact-type reading unit 6 are included as reading units that perform reading processing of a card related to payment, it is not limited thereto. It is sufficient so long as the portable electronic device includes one or more reading units.

In the embodiment, although the magnet insertion groove 42 and the IC insertion groove 52 are concaved in the left direction D32, it is not limited thereto. The magnet insertion groove 42 and the IC insertion groove 52 may be concaved to another direction (for example, right direction D31, thickness direction D1, longitudinal direction D2).

The contact-type IC reading unit 5, magnetic reading unit 4 and non-contact-type reading unit 6 may be arranged on the same side.

EXPLANATION OF REFERENCE NUMERALS 1 portable electronic device
2 housing
3 display unit
4 magnetic reading unit (reading unit)
5 contact-type IC reading unit (reading unit)
6 non-contact-type IC reading unit (reading unit)
21 front surface
22 back surface
23 top surface
24 bottom surface
25 right surface
26 left surface
41 magnetic sensor
42 magnet insertion groove
51 contact-type IC sensor (IC sensor)
52 IC insertion groove
61 non-contact-type IC sensor
421 bottom part
521 bottom part
522 embossing groove part
523 main groove part
524 overlapping region
525 interior region
526 entrance edge
C1 magnetic card
C2 contact-type IC card
C22 embossing
C3 non-contact-type IC card
D1 thickness direction
D11 front direction
D12 back direction
D2 longitudinal direction
D21 up direction
D22 down direction
D3 lateral direction
D31 right direction
D32 left direction, insertion direction

The invention claimed is:

1. A tablet-type portable electronic device comprising:
a plate-shaped housing;
a touch panel and display unit provided to a front surface of the housing; and
a reading unit that is integrally configured with the housing and performs reading processing of a card related to payment,
wherein the housing is substantially rectangular in a front view of the portable electronic device,
wherein the portable electric device includes a contact-type IC reading unit that performs reading processing of a contact-type IC card serving as the card, a magnetic reading unit that performs reading processing of a magnetic card serving as the card, and a non-contact-type IC reading unit that performs reading processing of a non-contact-type IC card serving as the card,
wherein the contact-type IC reading unit has a contact-type IC sensor that acquires electronic information from an IC chip of the contact-type IC card, and an IC insertion groove provided in the housing for guiding the IC chip of the contact-type IC card to a position of the IC sensor,
wherein the magnetic reading unit includes a magnetic sensor that acquires magnetic information from a magnetic recording part of the magnetic card, and a magnetic insertion groove provided in the housing for guiding the magnetic recording part of the magnetic card to a position of the magnetic sensor,
wherein the contact-type IC reading unit and the magnetic reading unit are arranged to a side of one vertical lateral surface along a shorter direction of the housing, as well as opening to an outer side in a longer direction of the housing and being concaved with a bottom to an inner side in the longer direction, and
wherein the non-contact-type IC reading unit is arranged to a side of the one vertical lateral surface or another vertical lateral surface along the shorter side of the housing, and can read a non-contact-type IC card arranged at the front surface of the housing.

2. The portable electric device according to claim 1, wherein the IC insertion groove and the magnet insertion groove are overlapping in portions thereof.

3. The portable electronic device according to claim 2, wherein a bottom part of the IC insertion groove is provided more in an interior region than a bottom part of the magnet insertion groove, in an insertion direction of the IC card to the IC insertion groove, and the contact-type IC sensor is arranged in the interior region.

4. The portable electronic device according to claim 3, wherein the IC insertion groove includes an embossing groove part having a shape corresponding to an embossing of the IC card.

5. The portable electronic device according to claim 2, wherein the IC insertion groove includes an embossing groove part having a shape corresponding to an embossing of the IC card.

6. The portable electronic device according to claim 1, wherein the IC insertion groove includes an embossing groove part having a shape corresponding to an embossing of the IC card.

* * * * *